United States Patent
Li et al.

(10) Patent No.: US 11,463,219 B2
(45) Date of Patent: Oct. 4, 2022

(54) REFERENCE SIGNAL TRANSMISSION METHOD, REFERENCE SIGNAL TRANSMISSION DEVICE, BASE STATION AND USER EQUIPMENT

(71) Applicant: CHINA ACADEMY OF TELECOMMUNICATIONS TECHNOLOGY, Beijing (CN)

(72) Inventors: Hui Li, Beijing (CN); Qiubin Gao, Beijing (CN); Rakesh Tamrakar, Beijing (CN); Runhua Chen, Beijing (CN); Xin Su, Beijing (CN); Deshan Miao, Beijing (CN); Qiuping Huang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/645,413

(22) PCT Filed: Sep. 5, 2018

(86) PCT No.: PCT/CN2018/104118
§ 371 (c)(1),
(2) Date: Mar. 6, 2020

(87) PCT Pub. No.: WO2019/047845
PCT Pub. Date: Mar. 14, 2019

(65) Prior Publication Data
US 2020/0287687 A1 Sep. 10, 2020

(30) Foreign Application Priority Data
Sep. 8, 2017 (CN) .......................... 201710805104.3

(51) Int. Cl.
H04L 5/00 (2006.01)

(52) U.S. Cl.
CPC .......... *H04L 5/0051* (2013.01); *H04L 5/0094* (2013.01)

(58) Field of Classification Search
None
See application file for complete search history.

(56) References Cited

U.S. PATENT DOCUMENTS

2016/0087709 A1* 3/2016 Horiuchi ............... H04L 5/0073
375/260
2018/0287759 A1* 10/2018 Kundargi .............. H04L 5/0051
(Continued)

FOREIGN PATENT DOCUMENTS

CN 108259145 A 7/2018
EP 3579515 A1 11/2019
(Continued)

OTHER PUBLICATIONS

International Search Report from PCT/CN2018/104118, dated Nov. 23, 2018, with English translation from WIPO.
(Continued)

*Primary Examiner* — Diane L Lo
(74) *Attorney, Agent, or Firm* — Ladas & Parry, LLP (57) ABSTRACT

The present disclosure provides a reference signal transmission method, a reference signal transmission device, a base station and a user equipment. The transmission method of the present disclosure includes: implicitly or explicitly indicating to a user equipment (UE), position information of a target subcarrier for mapping a target phase tracking reference signal (PTRS) port, among subcarriers occupied by a target demodulation reference signal (DMRS) port. The target DMRS port is a DMRS port associated with the target PTRS port.

17 Claims, 6 Drawing Sheets

(56) References Cited

U.S. PATENT DOCUMENTS

2020/0244415 A1* 7/2020 Liu ..................... H04B 7/0632
2020/0287751 A1* 9/2020 Lee ..................... H04L 27/2602
2020/0389270 A1* 12/2020 Lee ..................... H04L 5/0048

FOREIGN PATENT DOCUMENTS

WO  2017138871 A1  8/2017
WO  2019096919 A1  5/2019

OTHER PUBLICATIONS

Written Opinion from the International Searching Authority from PCT/CN2018/104118, dated Nov. 23, 2018, with English translation from WIPO.
International Preliminary Report on Patentability from PCT/CN2018/104118, dated Mar. 10, 2020, with English translation from WIPO.
Notification of Reasons for Refusal from TW app. No. 107130943, dated May 10, 2020, with machine English translation.
"PT-RS design", R1-1702959, 3GPP TSG RAN WG1 #88, Athens Greece, Feb. 13-17, 2017.
"Simulation results for Type II CSI reporting", R1-1703605, 3GPP TSG RAN WG1 #88, Athens Greece, Feb. 13-17, 2017.
"Discussion on explicit and implicit signaling for PT-RS", R1-1708272, 3GPP TSG-RAN WG1 Meeting #89, Hangzhou, P.R. of China, May 15-19, 2017.
"Considerations on RS for phase tracking", R1-1712385, 3GPP TSG RAN WG1 Meeting #90, Prague, Czechia, Aug. 21-25, 2017.
"Discussion on PTRS/DMRS port association", R1-1712683, 3GPP TSG RAN WG1 Meeting #90, Prague, Czechia, Aug. 21-25, 2017.
"Discussion on PT-RS", R1-1712843, 3GPP TSG RAN WG1 Meeting #90, Prague, Czechia, Aug. 21-25, 2017.
"DL PTRS Considerations", R1-1713410, 3GPP TSG RAN WG1 Meeting #90, Prague, Czechia, Aug. 21-25, 2017.
"DL PT-RS design", R1-1703605, 3GPP TSG RAN WG1 Meeting #90, Prague, Czechia, Aug. 21-25, 2017.
Extended European Search Report from EP app. No. 18854508.1, dated Oct. 1, 2020.
"Discussion on PT-RS design for CP-OFDM", R1-1711308, 3GPP TSG RAN WG1 NR Ad-Hoc#2, Qingdao, P.R. China, Jun. 27-30, 2017.
"RRC parameters for PTRS", R1-1719071, 3GPP TSG RAN WG1 Meeting 90bis, Prague, CZ, Oct. 9-13, 2017.
Notice of Reasons for Refusal from JP app. No. 2020-514171, dated Apr. 20, 2018, with English translation from Global Dossier.
Notification of Reasons for Refusal from KR app. No. 10-2020-7008387, dated Jun. 11, 2021, with English translation from Global Dossier.
"Discussion on RS for phase tracking", R1-1707132, 3GPP TSG RAN WG1 Meeting #89, Hangzhou, China, May 14-19, 2017.
"PT-RS design", R1-1713021, 3GPP TSG RAN WG1 Meeting #90, Prague, Czechia, Aug. 21-25, 2017.

* cited by examiner

REFERENCE SIGNAL TRANSMISSION METHOD, REFERENCE SIGNAL TRANSMISSION DEVICE, BASE STATION AND USER EQUIPMENT

CROSS-REFERENCE TO RELATED APPLICATIONS

This application is the U.S. national phase of PCT Application PCT/CN2018/104118 filed on Sep. 5, 2018, which claims the benefit and priority of Chinese Application No. 201710805104.3, filed on Sep. 8, 2017, the disclosures of which are incorporated in their entireties by reference herein.

TECHNICAL FIELD

The present disclosure relates to the technical field of communication applications, and in particular to a reference signal transmission method, a reference signal transmission device, a base station and a user equipment.

BACKGROUND

Phase noise comes from local oscillators in a transmitter and a receiver, and may affect transmission of multi-carrier signals. Especially in the high frequency band (above 6 GHz), influence of the phase noise is more serious, and thus it is necessary to perform phase noise compensation for received signals to ensure the system performance. By introducing a phase tracking reference signal (PTRS) at a transmitting end, phase changes caused by phase noise can be tracked, thereby ensuring that a receiver can estimate the phase noise of the link and compensate the influence of the phase noise.

In the new radio (NR) system, PTRS is transmitted in UE-scheduled frequency band, and may be mapped every one physical resource block (PRB), every two PRBs or every four PRBs, depending on varied frequency domain density. In the PRB including PTRS, each PTRS port is mapped to at least one subcarrier. Each PTRS port corresponds to a group of demodulation reference signal (DMRS) ports, hereinafter referred to as group correspondence. Each DMRS port within the group is affected by the same phase noise source, and this PTRS port is used to compensate for the phase noise of each DMRS port within the group. If there are multiple phase noise sources, multiple PTRS ports are required.

Similar to DMRS, PTRS also needs to be pre-coded for transmission. To compensate for the influence of phase noise, the precoding used by the PTRS is related to the precoding used by the group of DMRS ports corresponding to this PTRS port. Meanwhile, in order to ensure the compensation accuracy, the PTRS should be mapped to the subcarrier where the corresponding DMRS port group is located. Currently, one implementation manner is to pre-define that PTRS port uses a precoding used by a fixed DMRS port in a DMRS port group corresponding to the PTRS port and is mapped to a subcarrier where the DMRS port is located, which is hereinafter referred to as a port correspondence. This fixed DMRS port may be a DMRS port with the smallest index in the group. However, there is no corresponding solution about how to map a PTRS port to a subcarrier where a DMRS port associated with the PTRS port is located.

SUMMARY

An object of the present disclosure is to provide a reference signal transmission method, a reference signal transmission device, a base station and a user equipment, which can solve the problem that there is no corresponding solution about how to map a PTRS port to a subcarrier where a DMRS port associated with the PTRS port is located.

In order to achieve the above object, the present disclosure provides a reference signal transmission method, applied to a base station, including: implicitly or explicitly indicating to a user equipment (UE), position information of a target subcarrier for mapping a target phase tracking reference signal (PTRS) port, among subcarriers occupied by a target demodulation reference signal (DMRS) port; wherein the target DMRS port is a DMRS port associated with the target PTRS port.

The above reference signal transmission method further includes: transmitting a PTRS to the UE on the target subcarrier.

The explicitly indicating to the UE, the position information of the target subcarrier for mapping the PTRS port, among subcarriers occupied by the target DMRS port, includes: transmitting the position information to the UE by signaling; wherein the position information includes: offset information of a preset reference subcarrier corresponding to the target DMRS port relative to the target subcarrier.

Before the step of indicating to the UE, the position information of the target subcarrier for mapping the PTRS port, among subcarriers occupied by the target DMRS port, the method further includes: selecting the target subcarrier for mapping the PTRS port from the subcarriers occupied by the target DMRS port; and determining offset information of the target subcarrier relative to the preset reference subcarrier.

The implicitly indicating to the UE, the position information of the target subcarrier for mapping the PTRS port, among subcarriers occupied by the target DMRS port, includes: indicating the position information to the UE by predefinition; wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in a preset DMRS ports group; the DMRS ports in the same preset DMRS ports group occupy the same subcarriers, and the DMRS ports in different preset DMRS ports groups occupy different subcarriers.

In order to achieve the above object, the present disclosure provides a reference signal transmission method, applied to a user equipment (UE), including: obtaining position information of a target subcarrier implicitly or explicitly indicated by a base station; wherein the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port; and determining a target subcarrier according to the position information.

The above reference signal transmission method further includes: obtaining PTRS on the target subcarrier and performing phase noise estimation according to the PTRS.

The step of determining a target subcarrier according to the position information, includes: determining a target DMRS port associated with the target PTRS port; and according to the position information, determining the target subcarrier from subcarriers occupied by the target DMRS port.

The obtaining position information of a target subcarrier explicitly indicated by a base station, includes: obtaining the position information transmitted by the base station via signaling; wherein the position information includes: offset information of a preset reference subcarrier corresponding to the target DMRS port relative to the target subcarrier.

The obtaining position information of a target subcarrier implicitly indicated by a base station, includes: obtaining the position information of the target subcarrier by predefinition; wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in a preset DMRS ports group; the DMRS ports in the same preset DMRS ports group occupy the same subcarriers, and the DMRS ports in different preset DMRS ports groups occupy different subcarriers.

In order to achieve the above object, the present disclosure provides a base station including: a transceiver, a memory, a processor, and a computer program stored on the memory and executable on the processor; wherein the processor executes the computer program to implement the following steps: implicitly or explicitly indicating to a user equipment (UE), position information of a target subcarrier for mapping a target phase tracking reference signal (PTRS) port, among subcarriers occupied by a target demodulation reference signal (DMRS) port; wherein the target DMRS port is a DMRS port associated with the target PTRS port.

The processor executes the computer program to further implement the following steps: transmitting a PTRS to the UE on the target subcarrier through the transceiver.

The processor executes the computer program to further implement the following steps: transmitting the position information to the UE by signaling through the transceiver; wherein the position information includes: offset information of a preset reference subcarrier corresponding to the target DMRS port relative to the target subcarrier.

The processor executes the computer program to further implement the following steps: selecting the target subcarrier for mapping the PTRS port from the subcarriers occupied by the target DMRS port; and determining offset information of the target subcarrier relative to the preset reference subcarrier.

The processor executes the computer program to further implement the following steps: indicating the position information to the UE by predefinition; wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in a preset DMRS ports group; the DMRS ports in the same preset DMRS ports group occupy the same subcarriers, and the DMRS ports in different preset DMRS ports groups occupy different subcarriers.

In order to achieve the above object, the present disclosure provides a computer readable storage medium including a computer program stored thereon; wherein the computer program is executed by a processor to implement the following steps: implicitly or explicitly indicating to a user equipment (UE), position information of a target subcarrier for mapping a target phase tracking reference signal (PTRS) port, among subcarriers occupied by a target demodulation reference signal (DMRS) port; wherein the target DMRS port is a DMRS port associated with the target PTRS port.

In order to achieve the above object, the present disclosure provides a user equipment (UE) including: a transceiver, a memory, a processor, and a computer program stored on the memory and executable on the processor; wherein the processor executes the computer program to implement the following steps: obtaining position information of a target subcarrier implicitly or explicitly indicated by a base station; wherein the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port; and determining a target subcarrier according to the position information.

The processor executes the computer program to further implement the following steps: obtaining PTRS on the target subcarrier and performing phase noise estimation according to the PTRS.

The processor executes the computer program to further implement the following steps: determining a target DMRS port associated with the target PTRS port; and according to the position information, determining the target subcarrier from subcarriers occupied by the target DMRS port.

The processor executes the computer program to further implement the following steps: obtaining the position information transmitted by the base station via signaling through the transceiver; wherein the position information includes: offset information of a preset reference subcarrier corresponding to the target DMRS port relative to the target subcarrier.

The processor executes the computer program to further implement the following steps: obtaining the position information of the target subcarrier by predefinition; wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in a preset DMRS ports group; the DMRS ports in the same preset DMRS ports group occupy the same subcarriers, and the DMRS ports in different preset DMRS ports groups occupy different subcarriers.

In order to achieve the above object, the present disclosure provides a computer readable storage medium including a computer program stored thereon; wherein the computer program is executed by a processor to implement the following steps: obtaining position information of a target subcarrier implicitly or explicitly indicated by a base station; wherein the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port; and determining a target subcarrier according to the position information.

In order to achieve the above object, the present disclosure provides a reference signal transmission device, applied to a base station, including: an indication module configured to, implicitly or explicitly indicate to a user equipment (UE), position information of a target subcarrier for mapping a target phase tracking reference signal (PTRS) port, among subcarriers occupied by a target demodulation reference signal (DMRS) port; wherein the target DMRS port is a DMRS port associated with the target PTRS port.

The indication module includes: a first indication submodule configured to transmit the position information to the UE by signaling; wherein the position information includes: offset information of a preset reference subcarrier corresponding to the target DMRS port relative to the target subcarrier.

The indication module includes: a second indication submodule configured to indicate the position information to the UE by predefinition; wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in a preset DMRS ports group; the DMRS ports in the same preset DMRS ports group occupy the same subcarriers, and the DMRS ports in different preset DMRS ports groups occupy different subcarriers.

In order to achieve the above object, the present disclosure provides a reference signal transmission device, applied to a user equipment (UE), including: an obtaining module configured to obtain position information of a target subcarrier implicitly or explicitly indicated by a base station; wherein the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port; and a determining module configured to determine the target subcarrier according to the position information.

The obtaining module includes: a first obtaining submodule configured to obtain the position information transmitted by the base station via signaling; wherein the position information includes: offset information of a preset reference subcarrier corresponding to the target DMRS port relative to the target subcarrier.

The obtaining module includes: a second obtaining submodule configured to obtain the position information of the target subcarrier by predefinition; wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in a preset DMRS ports group; the DMRS ports in the same preset DMRS ports group occupy the same subcarriers, and the DMRS ports in different preset DMRS ports groups occupy different subcarriers.

The embodiments of the present disclosure have the following beneficial effects:

According to technical solutions of the embodiments of the present disclosure, the position information of the target subcarrier for mapping the PTRS port, among subcarriers occupied by the target DMRS port, is implicitly or explicitly indicated to the UE, so that the UE can determine the target subcarrier according to the position information and then obtains PTRS transmitted by the base station on the target subcarrier, thereby achieving the purpose of transmitting PTRS according to the position information and preventing different PTRS ports from being mapped to the same subcarrier and then effectively ensuring orthogonality between different PTRS ports.

DETAILED DESCRIPTION

In order to make technical problems to be solved, technical solutions, and advantages of the present disclosure more clearly, detailed description will be provided hereinafter in conjunction with the accompanying drawings and embodiments.

Embodiments of the present disclosure provide a reference signal transmission method, a reference signal transmission device, a base station and a user equipment, which can solve the problem that there is no corresponding solution about how to map a PTRS port to a subcarrier where a DMRS port associated with the PTRS port is located.

Figure 1:
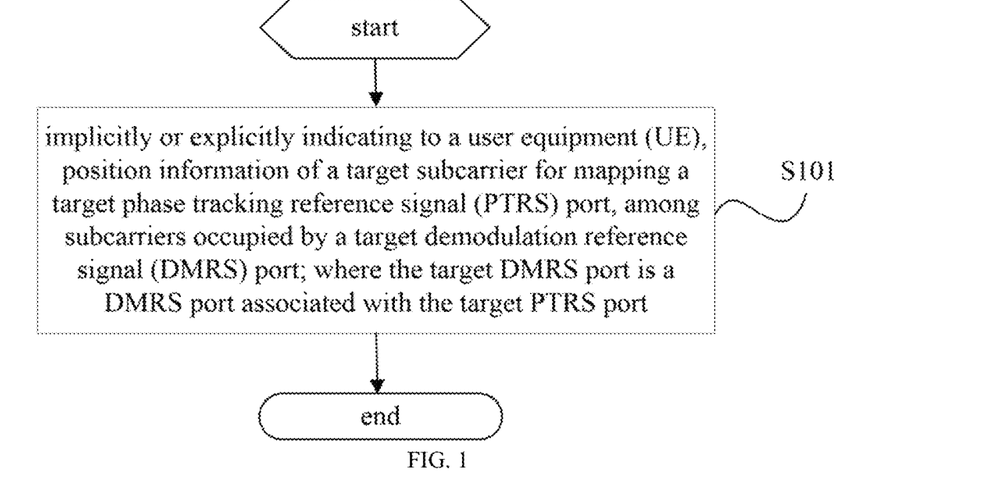
FIG. 1 is a first working flowchart of a reference signal transmission method according to an embodiment of the present disclosure.

As shown in FIG. 1, one embodiment of the present disclosure provides a reference signal transmission method, applied to a base station, including:

Step S101: implicitly or explicitly indicating to a user equipment (UE), position information of a target subcarrier for mapping a target phase tracking reference signal (PTRS) port, among subcarriers occupied by a target demodulation reference signal (DMRS) port; where the target DMRS port is a DMRS port associated with the target PTRS port.

In one embodiment of the present disclosure, each PTRS port corresponds to a DMRS ports group. Further, each PTRS port corresponds to a preset DMRS port in the DMRS ports group. For example, each PTRS port corresponds to a DMRS port with the smallest port index in the DMRS ports group.

The above position information includes: offset information of a preset reference subcarrier corresponding to the target DMRS port relative to the target subcarrier, position of a subcarrier for mapping the PTRS port among subcarriers occupied by each DMRS port, or offset information of a subcarrier for mapping the PTRS port among subcarriers occupied by each DMRS port relative to a preset reference subcarrier corresponding to the each DMRS port. The target PTRS port is a PTRS port that currently requires subcarrier mapping.

The position information of the target subcarrier for mapping the PTRS port, among subcarriers occupied by the target DMRS port, is indicated to the UE, so that the UE can determine the target subcarrier according to the position information and ensure orthogonality between different PTRS ports.

Further, after the step S101, the method further includes: transmitting a PTRS to the UE on the target subcarrier.

In the reference signal transmission method in the embodiment of the present disclosure, the base station indicates the position information of the target subcarrier to the UE, maps the PTRS to the target subcarrier and transmits it to the UE.

Further, in the above step S101, explicitly indicating to the UE, the position information of the target subcarrier for mapping the PTRS port, among subcarriers occupied by the target DMRS port, includes:

transmitting the position information to the UE by signaling;

where the position information includes: offset information of a preset reference subcarrier corresponding to the target DMRS port relative to the target subcarrier.

The preset reference subcarrier herein is a subcarrier that is predefined in the communication system and is known to the base station and the UE. Specifically, according to order of subcarriers in one PRB, an S-th subcarrier occupied by each DMRS port is defined as a preset reference subcarrier.

Further, before the step of indicating to the UE, the position information of the target subcarrier for mapping the PTRS port, among subcarriers occupied by the target DMRS port, the method further includes:

selecting the target subcarrier for mapping the PTRS port from the subcarriers occupied by the target DMRS port; and determining offset information of the target subcarrier relative to the preset reference subcarrier.

The above offset information may specifically be frequency offset information, subcarrier offset information and/or PRB offset information.

In the embodiment of the present disclosure, according to preset correspondence between PTRS ports and DMRS ports groups, the base station first determines the DMRS ports group corresponding to each PTRS port configured by the base station; then, according to the system agreement, determines one DMRS port in the DMRS ports group as being corresponding to the each PTRS port. Then, the base station selects a target subcarrier for mapping a target PTRS port from subcarriers occupied by a target DMRS port associated with the target PTRS port, and then determines offset information of the target subcarrier relative to the preset reference subcarrier.

A specific application flow of one embodiment of the present disclosure is described below.

(1) The system pre-defines that an S-th subcarrier occupied by each DMRS port in one PRB is a preset reference subcarrier. This preset reference subcarrier is known to the base station and the UE.

(2) For each PTRS port configured by the base station, the base station determines a DMRS port associated with the each PTRS port, and determines a value of a subcarrier offset S_offset of the each PTRS port. The value of this S_offset may be a positive integer, zero or a negative integer.

(3) The base station informs the UE of the subcarrier offset S_offset of each PTRS port by signaling, simultaneously maps PTRS of each port to the subcarrier determined by S and S_offset in the PRB including the PTRS and transmits it.

In the reference signal transmission method in the embodiment of the present disclosure, the system pre-defines the preset reference subcarrier; the base station determines a position of each PTRS port in the subcarriers where the DMRS port associated with the each PTRS port is located, determines the offset information of the subcarrier for mapping the each PTRS port relative to the reset reference subcarrier, and informs the UE of the offset information by signaling, thereby achieving the purpose of mapping the PTRS port to the subcarrier where the DMRS port associated with the PTRS is located while ensuring orthogonality between different PTRS ports.

Further, in the above step S101, implicitly indicating to the UE, the position information of the target subcarrier for mapping the PTRS port, among subcarriers occupied by the target DMRS port, includes: indicating the position information to the UE by predefinition.

The position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

Further, the each DMRS port is a port in the preset DMRS ports group.

The DMRS ports in the same preset DMRS ports group occupy the same subcarriers, and the DMRS ports in different preset DMRS ports groups occupy different subcarriers. For different DMRS ports of the same preset DMRS ports group, different subcarriers are used for mapping PTRS ports.

Figure 2A:
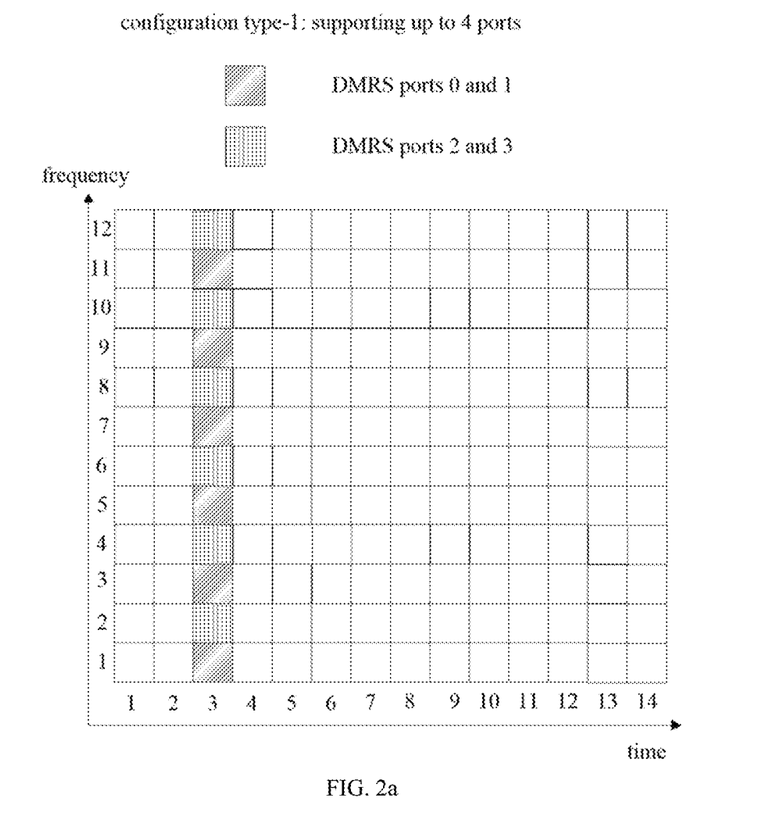
FIG. 2a is a schematic diagram of a first configuration of DMRS according to an embodiment of the present disclosure.
Figure 2B:
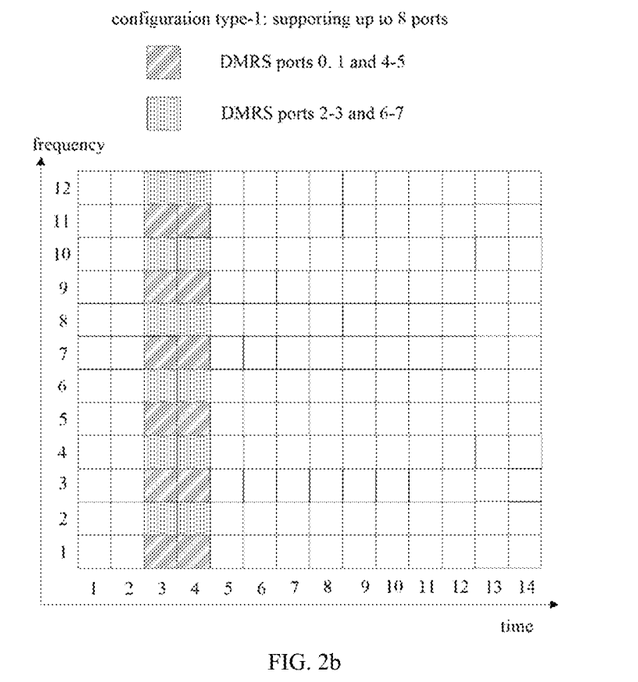
FIG. 2b is a schematic diagram of a second configuration of DMRS according to an embodiment of the present disclosure.
Figure 2C:
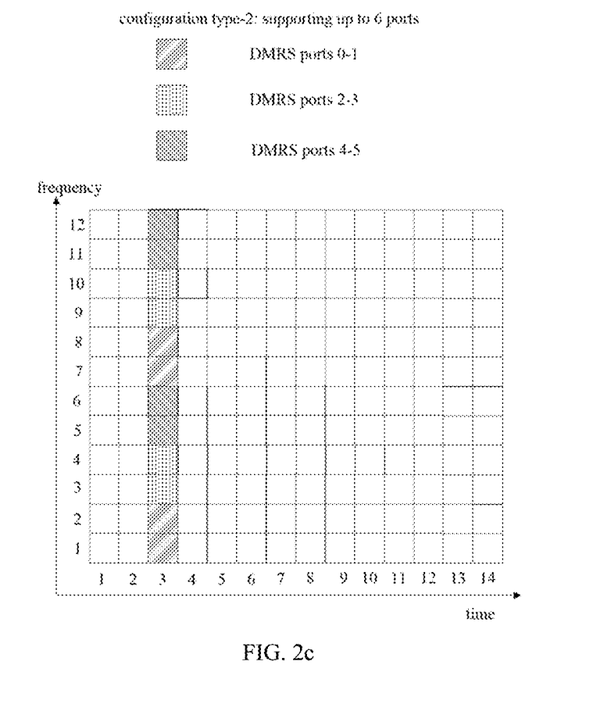
FIG. 2c is a schematic diagram of a third configuration of DMRS according to an embodiment of the present disclosure.
Figure 2D:
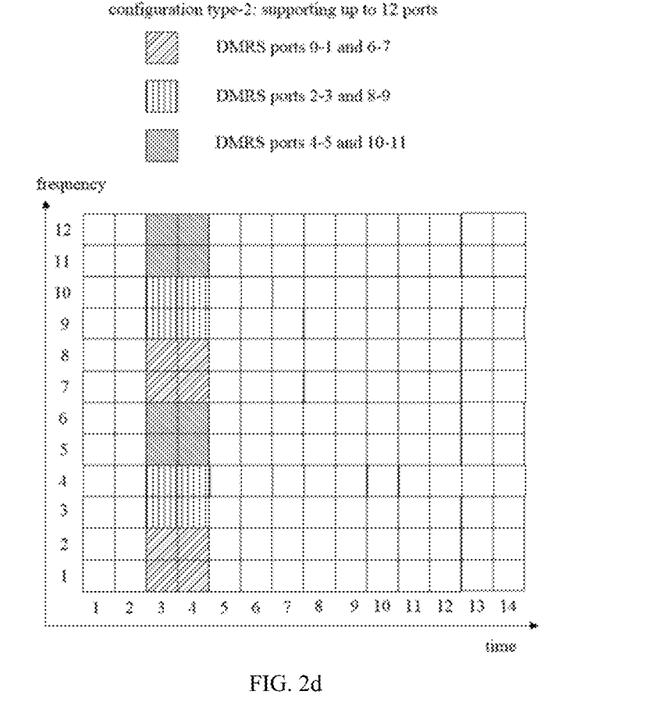
FIG. 2d is a schematic diagram of a fourth configuration of DMRS according to an embodiment of the present disclosure.

In one embodiment of the present disclosure, configurations of the DMRS include two configuration types, and each configuration type includes two options: one orthogonal frequency division multiplexing (OFDM) symbol and two OFDM symbols. A configuration type-1 is as shown in FIG. 2a and FIG. 2b. A configuration type-2 is as shown in FIG. 2c and FIG. 2d. The maximum number of DMRS ports supported by each DMRS configuration is divided into multiple DMRS ports groups, which may be referred to as subcarrier-position-based DMRS port groups (i.e., preset DMRS port groups). DMRS ports in each subcarrier-position-based DMRS port group occupy the same subcarriers; and DMRS ports in different subcarrier-position-based DMRS port groups different subcarriers.

In each subcarrier-position-based DMRS port group, the system pre-defines a position of a subcarrier for mapping a PTRS port among subcarriers occupied by each DMRS port, or pe-defines offset information of a subcarrier for mapping a PTRS port among subcarriers occupied by each DMRS port relative to a preset reference subcarrier corresponding to the each DMRS port. System-defined information is known to base stations and UEs. In different subcarrierposition-based DMRS port groups, offset information of the subcarrier for mapping the PTRS port may be the same or varied.

For each PTRS port configured by the base station, the base station determines a DMRS port associated with the each PTRS port; according to the above pre-defined position information, the base station determines a subcarrier to which the each PTRS port is mapped, and transmits the PTRS to the UE.

In the reference signal transmission method of one embodiment of the present disclosure, the position information is indicated to the UE through the predefinition, and the PTRS can be transmitted according to the position information. This can prevent different PTRS ports from being mapped to the same subcarrier, thereby ensuring orthogonality between different PTRS ports.

Figure 3:
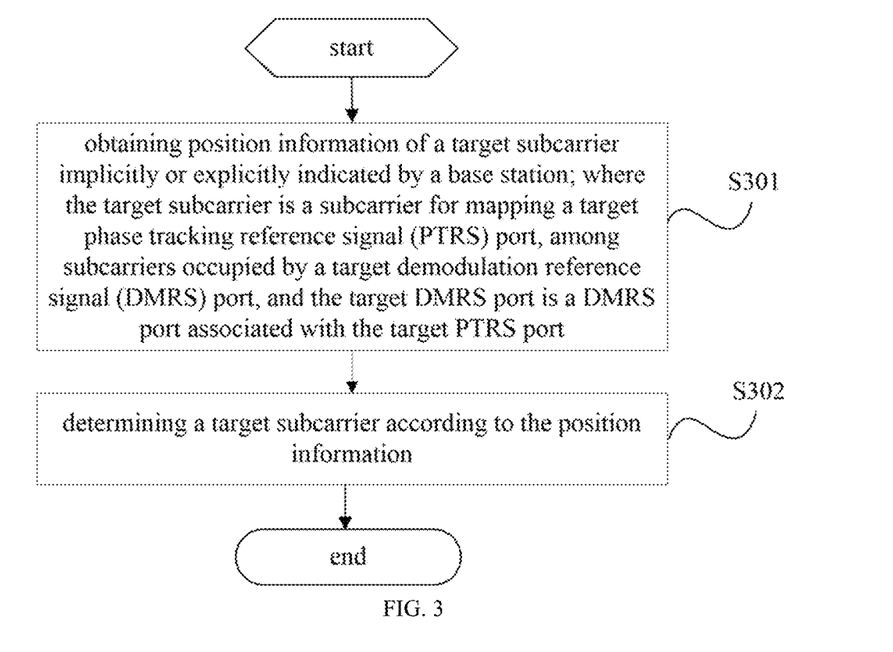
FIG. 3 is a second working flowchart of a reference signal transmission method according to an embodiment of the present disclosure.

As shown in FIG. 3, one embodiment of the present disclosure further provides a reference signal transmission method, which is applied to a user equipment, including the following steps.

Step S301: obtaining position information of a target subcarrier implicitly or explicitly indicated by a base station; where the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port.

The above position information includes: offset information of a preset reference subcarrier corresponding to the target DMRS port relative to the target subcarrier, position of a subcarrier for mapping the PTRS port among subcarriers occupied by each DMRS port, or offset information of a subcarrier for mapping the PTRS port among subcarriers occupied by each DMRS port relative to a preset reference subcarrier corresponding to the each DMRS port. The target PTRS port is a PTRS port that currently requires subcarrier mapping.

Step S302: determining a target subcarrier according to the position information.

In the reference signal transmission method of one embodiment of the present disclosure, the UE obtains the position information of the target subcarrier implicitly or explicitly indicated by the base station, and determine the target subcarrier according to the position information. In one embodiment of the present disclosure, the UE determines the target subcarrier according to the position information of the target subcarrier indicated by the base station and then performs transmission, thereby effectively ensuring orthogonality between different PTRS ports.

Further, after the above step S302, the method further includes: obtaining PTRS on the target subcarrier and performing phase noise estimation according to the PTRS.

In one embodiment of the present disclosure, by obtaining the PTRS transmitted by the base station on the target subcarrier, it is ensured that a receiver can estimate the phase noise of the link and compensate the influence of the phase noise.

Further, the above step S302 includes:

determining a target DMRS port associated with the target PTRS port; according to the position information, determining the target subcarrier from subcarriers occupied by the target DMRS port.

Specifically, the UE receives correspondence between each PTRS port and DMRS ports group notified by the base station through signaling. According to the correspondence and the system agreement, the UE determines correspondence between each PTRS port and one DMRS in the DMRS ports group; and then, according to the above position information, the UE further determines the target subcarrier from subcarriers occupied by the target DMRS port.

Further, in the above step S301, obtaining position information of a target subcarrier explicitly indicated by a base station, includes:

obtaining the position information transmitted by the base station via signaling;

where the position information includes: offset information of a preset reference subcarrier corresponding to the target DMRS port relative to the target subcarrier.

Further, in the above step S301, obtaining position information of a target subcarrier implicitly indicated by a base station, includes: obtaining the position information of the target subcarrier by predefinition.

The position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in a preset DMRS ports group.

The DMRS ports in the same preset DMRS ports group occupy the same subcarriers, and the DMRS ports in different preset DMRS ports groups occupy different subcarriers.

Specific application examples of the present disclosure are described hereinafter.

Embodiment One

It is assumed that the configuration type of DMRS is the configuration type shown in FIG. 2b.

Base Station:

(1) The system pre-defines that a (S=1)-th subcarrier occupied by each DMRS port in one PRB is a preset reference subcarrier. This preset reference subcarrier is known to the base station and the UE. That is, for DMRS ports 0, 1, 4 and 5, the preset reference subcarrier is subcarrier 1; and for DMRS ports 2, 3, 6 and 7, the preset reference subcarrier is subcarrier 2.

(2) The base station configures two PTRS ports. The base station determines that PTRS port 0 has a group correspondence with DMRS ports 0-3 and uses precoding of DMRS port 0, i.e., PTRS port 0 has a port correspondence with DMRS port 0. The base station determines that PTRS port 1 has a group correspondence with DMRS ports 4-7 and uses precoding of DMRS port 4, i.e., PTRS port 1 has a port correspondence with DMRS port 4. It is assumed that the value of S_offset represents the number of offset subcarriers. As can be seen from FIG. 2b, since DMRS port 0 and DMRS port 4 occupy the same subcarriers, the base station determines that the subcarrier offset indication of PTRS port 0 is S_offset0=0, and the subcarrier offset indication of PTRS port 1 is S_offset1=2. It should be noted that the value of S_offset may also indicate other meanings, such as the offset to the S_offset subcarrier occupied by the DMRS port, or the number of offset PRBs.

Figure 4:
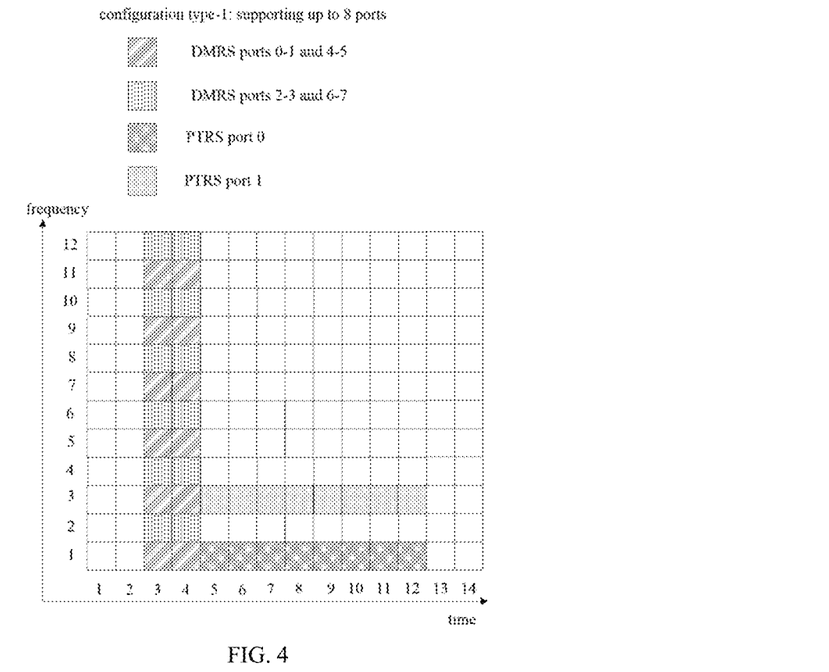
FIG. 4 is a first mapping diagram of PTRS according to an embodiment of the present disclosure.

(3) The base station informs the UE by signaling the subcarrier offset S_offset of each PTRS port. As shown in FIG. 4, PTRS port 0 does not offset on the preset reference subcarrier, and PTRS port 1 offsets 2 subcarriers on the reference subcarrier and is transmitted.

UE:

(1) The UE receives the group correspondence between PTRS port 0 and DMRS ports 0-3, as well as the group correspondence between PTRS port 1 and DMRS ports 4-7, which are transmitted by the base station through signaling.

(2) According to the group correspondence and the system agreement that each PTRS port has a port correspondence with a DMRS port with the smallest port index in the DMRS ports group, the UE determines that PTRS port 0 has a port correspondence with DMRS port 0, and PTRS port 1 has a port correspondence with DMRS port 4.

(3) The UE receives the subcarrier offset S_offset of each PTRS port notified by the base station via signaling.

(4) the UE determines the subcarrier where PTRS of each port is located according to the preset reference subcarrier S predefined in the system and S_offset, that is, PTRS port 0 does not offset relative to the preset reference subcarrier and is located on the subcarrier 1, and PTRS port 1 offsets 2 subcarriers relative to the reference subcarrier and is located on the subcarrier 3; and then the UE performs phase noise estimation.

Embodiment 2

It is assumed that the position information is offset information of a subcarrier for mapping the PTRS port among subcarriers occupied by each DMRS port in a preset DMRS port group relative to a preset reference subcarrier corresponding to the each DMRS port.

Base Station:

(1) In FIG. 2a, there are two subcarrier-position-based DMRS port groups; ports 0 and 1 are in one group; ports 2 and 3 are in one group. In FIG. 2b, there are two subcarrier-position-based DMRS port groups; ports 0, 1, 4 and 5 are in one group; ports 2, 3, 6 and 7 are in one group. In FIG. 2c, there are three subcarrier-position-based DMRS port groups; ports 0 and 1 are in one group; ports 2 and 3 are in one group; and ports 4 and 5 are in one group. In FIG. 2d, there are three subcarrier-position-based DMRS port groups; ports 0, 1, 6 and 7 are in one group; ports 2, 3, 8 and 9 are in one group; and ports 4, 5, 10 and 11 are in one group.

(2) For example, in FIG. 2d, in the group of the ports 0, 1, 6, and 7, offset information of PTRS port relative to subcarrier of each DMRS port is defined, as shown in Table 1.

TABLE 1

| DMRS port | 0 | 1 | 6 | 7 |
|---|---|---|---|---|
| offset relative to a first subcarrier of DMRS port (unit: subcarrier) | 0 | 1 | 6 | 7 |

In the group of the ports 2, 3, 8 and 9, offset information of PTRS port relative to subcarrier of each DMRS port is defined, as shown in Table 2.

TABLE 2

| DMRS port | 2 | 3 | 8 | 9 |
|---|---|---|---|---|
| offset relative to a first subcarrier of DMRS port (unit: subcarrier) | 0 | 1 | 6 | 7 |

In the group of the ports 4, 5, 10 and 11, offset information of PTRS port relative to subcarrier of each DMRS port is defined, as shown in Table 3.

TABLE 3

| DMRS port | 4 | 5 | 10 | 11 |
|---|---|---|---|---|
| offset relative to a first subcarrier of DMRS port (unit: subcarrier) | 0 | 1 | 6 | 7 |

(3) The above steps 1-2 are predefined by the system and are known to the base station and the UE.

Figure 5:
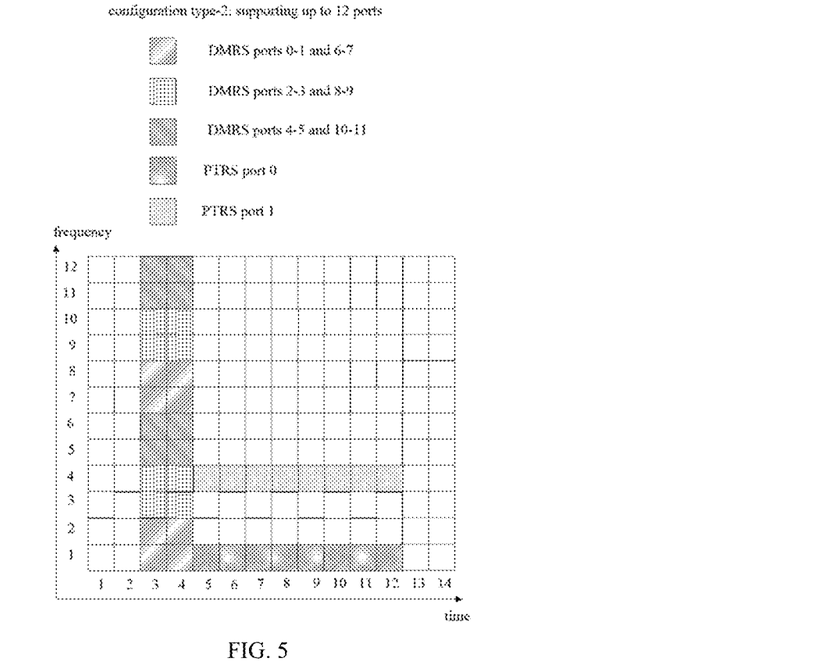
FIG. 5 is a second mapping diagram of PTRS according to an embodiment of the present disclosure.

(4) The base station configures two PTRS ports. The base station determines that PTRS port 0 has a group correspondence with DMRS ports 0-2 and uses precoding of DMRS port 0, i.e., PTRS port 0 has a port correspondence with DMRS port 0. The base station determines that PTRS port 1 has a group correspondence with DMRS ports 3-5 and uses precoding of DMRS port 3, i.e., PTRS port 1 has a port correspondence with DMRS port 3. According to Table 1, PTRS port 0 is mapped to the first subcarrier of DMRS port 0, i.e., transmitted on subcarrier 1. According to Table 2, PTRS port 1 is mapped to a subcarrier offset by one subcarrier relative to the first subcarrier of the DMRS port 3, i.e., transmitted on subcarrier 4, as shown in FIG. 5.

UE (1) The UE receives the group correspondence between PTRS port 0 and DMRS ports 0-2, as well as the group correspondence between PTRS port 1 and DMRS ports 3-5, which are transmitted by the base station through signaling.

(2) According to the group correspondence and the system agreement that each PTRS port has a port correspondence with a DMRS port with the smallest port index in the DMRS ports group, the UE determines that PTRS port 0 has a port correspondence with DMRS port 0, and PTRS port 1 has a port correspondence with DMRS port 3.

(3) According to the mapping relationship in Table 1 and Table 3 which are predefined by the system, the UE between determines that PTRS port 0 does not offset relative to the first subcarrier of DMRS port 0 and is located on the subcarrier 1, and PTRS port 1 offsets 1 subcarrier relative to the first subcarrier of DMRS port 3 and is located on the subcarrier 4; and then the UE performs phase noise estimation.

In the reference signal transmission method in the embodiment of the present disclosure, the position information of the target subcarrier for mapping the PTRS port, among subcarriers occupied by the target DMRS port, is implicitly or explicitly indicated to the UE, so that the UE can determine the target subcarrier according to the position information and then obtains PTRS transmitted by the base station on the target subcarrier, thereby achieving the purpose of transmitting PTRS according to the position information and preventing different PTRS ports from being mapped to the same subcarrier and then effectively ensuring orthogonality between different PTRS ports.

Figure 6:
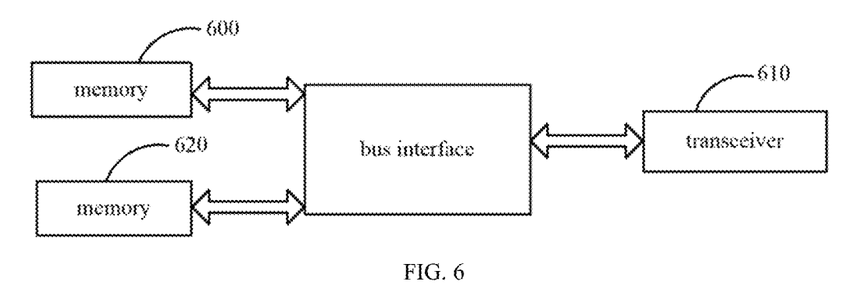
FIG. 6 is a schematic diagram of a base station according to an embodiment of the present disclosure.

As shown in FIG. 6, one embodiment of the present disclosure further provides a base station, including a memory 620, a processor 600, a transceiver 610, a bus interface, and a computer program stored on the memory 620 and executable on the processor 600. The processor 600 is used to read the program in the memory 620 and execute the following processes:

implicitly or explicitly indicating to a user equipment (UE), position information of a target subcarrier for mapping a target phase tracking reference signal (PTRS) port, among subcarriers occupied by a target demodulation reference signal (DMRS) port; where the target DMRS port is a DMRS port associated with the target PTRS port.

In FIG. 6, the bus architecture may include any number of interconnected buses and bridges. Specifically, one or more processors demonstrated with processor 600 are coupled with various circuits of memory, which is demonstrated with memory 620. The bus architecture may also link various other circuits, such as, peripherals, voltage regulators, and power management circuits, as is known in the art. Thus, in the application, no further description is provided. The bus interface provides an interface. The transceiver 610 may be composed of multiple components, that is, including a transmitter and a receiver, which provide a unit for communicating with various other devices via the transmitting medium. The processor 600 is in charge of managing bus architecture and general processing. The memory 620 may store data used when the processor 600 performs operations.

The processor 600 executes the computer program to further implement the following steps: implicitly or explicitly indicating to a user equipment (UE), position information of a target subcarrier for mapping a target phase tracking reference signal (PTRS) port, among subcarriers occupied by a target demodulation reference signal (DMRS) port; where the target DMRS port is a DMRS port associated with the target PTRS port.

The processor 600 executes the computer program to further implement the following steps: transmitting a PTRS to the UE on the target subcarrier through the transceiver.

The processor 600 executes the computer program to further implement the following steps: transmitting the position information to the UE by signaling through the transceiver.

The processor 600 executes the computer program to further implement the following steps: selecting the target subcarrier for mapping the PTRS port from the subcarriers occupied by the target DMRS port; and determining offset information of the target subcarrier relative to the preset reference subcarrier.

The processor 600 executes the computer program to further implement the following steps: indicating the position information to the UE by predefinition.

The position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in the preset DMRS ports group.

The DMRS ports in the same preset DMRS ports group occupy the same subcarriers, and the DMRS ports in different preset DMRS ports groups occupy different subcarriers.

In some embodiments of the present disclosure, a computer readable storage medium is provided and includes a computer program stored thereon. The computer program is executed by a processor to implement the following steps: implicitly or explicitly indicating to a user equipment (UE), position information of a target subcarrier for mapping a target phase tracking reference signal (PTRS) port, among subcarriers occupied by a target demodulation reference signal (DMRS) port; where the target DMRS port is a DMRS port associated with the target PTRS port.

When the program is executed by the processor, all implementation manners of the above method embodiments applied to the base station can be implemented. To avoid repetition, details are not described herein again.

Figure 7:
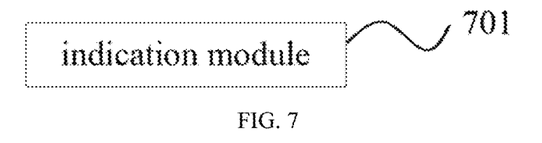
FIG. 7 is a first block diagram of a base station according to an embodiment of the present disclosure.

As shown in FIG. 7, one embodiment of the present disclosure further provides a reference signal transmission device, which is applied to a base station, and including:

an indication module 701 used to, implicitly or explicitly indicate to a user equipment (UE), position information of a target subcarrier for mapping a target phase tracking reference signal (PTRS) port, among subcarriers occupied by a target demodulation reference signal (DMRS) port; where the target DMRS port is a DMRS port associated with the target PTRS port.

Figure 8:
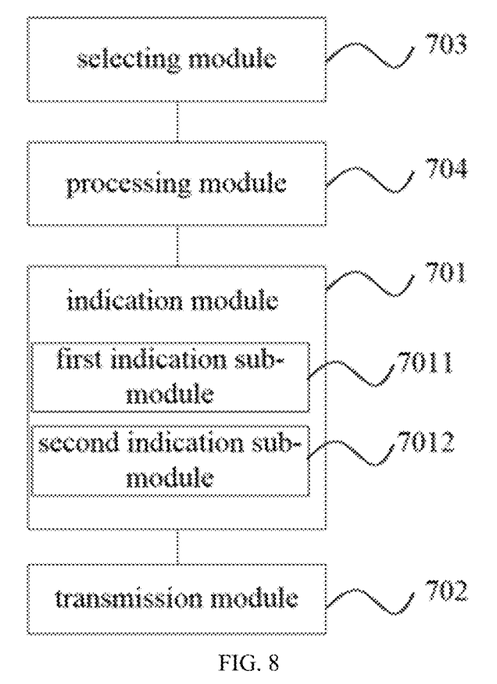
FIG. 8 is a second block diagram of a base station according to an embodiment of the present disclosure.

As shown in FIG. 8, the reference signal transmission device further includes: a transmission module 702 used to transmit a PTRS to the UE on the target subcarrier.

In the reference signal transmission device of the embodiment of the present disclosure, the indication module 701 includes: a first indication sub-module 7011 used to transmit the position information to the UE by signaling.

The position information includes: offset information of the preset reference subcarrier corresponding to the target DMRS port relative to the target subcarrier.

The reference signal transmission device of the embodiment of the present disclosure further includes:

a selecting module 703 used to select the target subcarrier for mapping the PTRS port from the subcarriers occupied by the target DMRS port;

a processing module 704 used to determine offset information of the target subcarrier relative to the preset reference subcarrier.

In the reference signal transmission device of the embodiment of the present disclosure, the indication module 701 includes:

a second indication sub-module 7012 used to indicate the position information to the UE by predefinition.

The position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

In the reference signal transmission device of the embodiment of the present disclosure, each DMRS port is a port in the preset DMRS ports group.

The DMRS ports in the same preset DMRS ports group occupy the same subcarriers, and the DMRS ports in different preset DMRS ports groups occupy different subcarriers.

In the reference signal transmission device in the embodiment of the present disclosure, the position information of the target subcarrier for mapping the PTRS port, among subcarriers occupied by the target DMRS port, is implicitly or explicitly indicated to the UE, so that the UE can determine the target subcarrier according to the position information and then obtains PTRS transmitted by the base station on the target subcarrier, thereby achieving the purpose of transmitting PTRS according to the position information and preventing different PTRS ports from being mapped to the same subcarrier and then effectively ensuring orthogonality between different PTRS ports.

It should be noted that the device is a device corresponding to the above method embodiment applied to the base station. All implementation manners in the above method embodiments are applicable to the device embodiment, and the same technical effects can be achieved.

Figure 9:
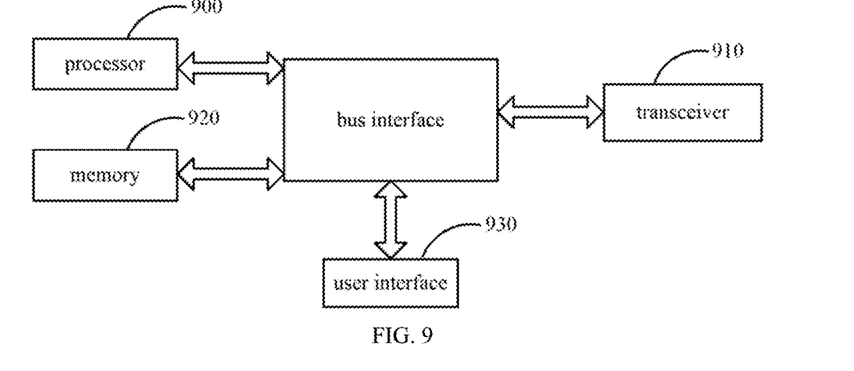
FIG. 9 is a schematic diagram of a user equipment according to an embodiment of the present disclosure.

In some embodiments of the present disclosure, as shown in FIG. 9, a user equipment (UE) is provided and includes: a memory 920, a processor 900, a transceiver 910, a user interface 930, a bus interface, and a computer program stored on the memory 920 and executable on the processor 900. The processor 900 is used to read the program in the memory 920 and execute the following processes:

obtaining position information of a target subcarrier implicitly or explicitly indicated by a base station; where the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port;

determining a target subcarrier according to the position information.

As shown in FIG. 9, the bus architecture may include any number of interconnected buses and bridges. Specifically, one or more processors demonstrated with processor 900 are coupled with various circuits of memory, which is demonstrated with memory 920. The bus architecture may also link various other circuits, such as, peripherals, voltage regulators, and power management circuits, as is known in the art. Thus, in the application, no further description is provided. The bus interface provides an interface. The transceiver 910 may be composed of multiple components, that is, including a transmitter and a receiver, which provide a unit for communicating with various other devices via the transmitting medium. For different user equipment, the user interface 930 may also be an interface capable of externally connecting required devices, including but not limited to a keypad, a display device, a speaker, a microphone, a joystick, and the like.

The processor 900 is responsible for managing the bus architecture and general processing, and the memory 920 can store data used by the processor 900 in performing operations.

The processor 900 is further used to read the program in the memory 920 to further implement the following steps: obtaining PTRS on the target subcarrier and performing phase noise estimation according to the PTRS.

The processor 900 is further used to read the program in the memory 920 to further implement the following steps: determining a target DMRS port associated with the target PTRS port; according to the position information, determining the target subcarrier from subcarriers occupied by the target DMRS port.

The processor 900 is further used to read the program in the memory 920 to further implement the following steps:

obtaining the position information transmitted by the base station via signaling through the transceiver;

where the position information includes: offset information of a preset reference subcarrier corresponding to the target DMRS port relative to the target subcarrier.

The processor 900 is further used to read the program in the memory 920 to further implement the following steps:

obtaining the position information of the target subcarrier by predefinition;

where the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

The each DMRS port is a port in a preset DMRS ports group.

The DMRS ports in the same preset DMRS ports group occupy the same subcarriers, and the DMRS ports in different preset DMRS ports groups occupy different subcarriers.

In some embodiments of the present disclosure, a computer readable storage medium is provided and includes a computer program stored thereon. The computer program is executed by a processor to implement the following steps:

obtaining position information of a target subcarrier implicitly or explicitly indicated by a base station; where the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port;

determining a target subcarrier according to the position information.

When the program is executed by the processor, all implementation manners of the above method embodiments applied to the UE can be implemented. To avoid repetition, details are not described herein again.

Figure 10:
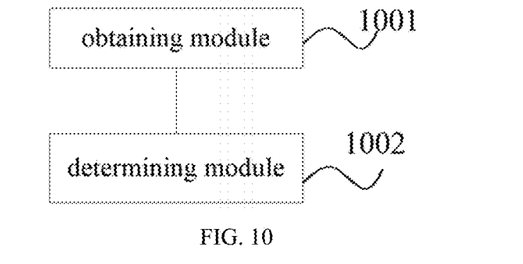
FIG. 10 is a first block diagram of a user equipment according to an embodiment of the present disclosure.

As shown in FIG. 10, one embodiment of the present disclosure further provides a reference signal transmission device, which is applied to a user equipment (UE), including:

an obtaining module 1001 used to obtain position information of a target subcarrier implicitly or explicitly indicated by a base station; where the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port; and a determining module 1002 used to determine a target subcarrier according to the position information.

Figure 11:
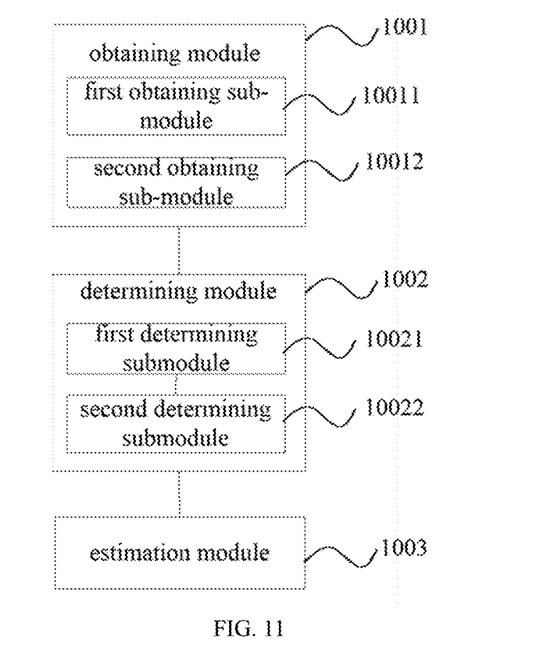
FIG. 11 is a second block diagram of a user equipment according to an embodiment of the present disclosure.

As shown in FIG. 11, the reference signal transmission device of one embodiment of the present disclosure further includes: an estimation module 1003 used to obtain PTRS on the target subcarrier and perform phase noise estimation according to the PTRS.

In the reference signal transmission device of one embodiment of the present disclosure, the determining module 1002 includes:

a first determining submodule 10021 used to determine a target DMRS port associated with the target PTRS port;

a second determining submodule 10022 used to, according to the position information, determine the target subcarrier from subcarriers occupied by the target DMRS port.

In the reference signal transmission device of one embodiment of the present disclosure, the obtaining module 1001 includes:

a first obtaining sub-module 10011 used to obtain the position information transmitted by the base station via signaling;

where the position information includes: offset information of a preset reference subcarrier corresponding to the target DMRS port relative to the target subcarrier.

In the reference signal transmission device of one embodiment of the present disclosure, the obtaining module 1001 includes:

a second obtaining sub-module 10012 used to obtain the position information of the target subcarrier by predefinition;

where the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

In the reference signal transmission device of one embodiment of the present disclosure, the each DMRS port is a port in a preset DMRS ports group.

The DMRS ports in the same preset DMRS ports group occupy the same subcarriers, and the DMRS ports in different preset DMRS ports groups occupy different subcarriers.

It should be noted that the device is a device corresponding to the above reference signal transmission method applied to the UE, and all implementation manners in the above method embodiments are applicable to the device embodiment, and the same technical effects can be achieved.

In various embodiments of the present disclosure, it should be understood that the size of serial numbers of the above procedures does not mean the execution sequence, and the execution sequence of various procedures should be determined by their function and internal logic, and shall not constitute any limitation on the implementation process of the embodiments of the present disclosure.

Foregoing describes optional implementation modes of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A reference signal transmission method, applied to a base station, comprising:
    implicitly or explicitly indicating to a user equipment (UE), position information of a target subcarrier for mapping a target phase tracking reference signal (PTRS) port, among subcarriers occupied by a target demodulation reference signal (DMRS) port; wherein the target DMRS port is a DMRS port associated with the target PTRS port;
    transmitting a PTRS according to the position information with different PTRS ports being mapped to different subcarriers;
    wherein explicitly indicating to the UE, the position information of the target subcarrier for mapping the PTRS port, among subcarriers occupied by the target DMRS port, includes:
    transmitting the position information to the UE by signaling;
    wherein the position information includes: offset information of a preset reference subcarrier corresponding to the target DMRS port relative to the target subcarrier;
    wherein before indicating to the UE, the position information of the target subcarrier for mapping the PTRS port, among subcarriers occupied by the target DMRS port, the method further includes:
    selecting the target subcarrier for mapping the PTRS port from the subcarriers occupied by the target DMRS port; and
    determining offset information of the target subcarrier relative to the preset reference subcarrier.

2. The method according to claim 1, further comprising: transmitting a PTRS to the UE on the target subcarrier.

3. The method according to claim 1, wherein implicitly indicating to the UE, the position information of the target subcarrier for mapping the PTRS port, among subcarriers occupied by the target DMRS port, includes:
    indicating the position information to the UE by protocol predefinition;
    wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

4. The method according to claim 3, wherein the each DMRS port is a port in a preset DMRS ports group;
    the DMRS ports in the same preset DMRS ports group occupy the same subcarriers, and the DMRS ports in different preset DMRS ports groups occupy different subcarriers.

5. The method according to claim 1, wherein the each DMRS port is a port in a preset DMRS ports group;
    before implicitly or explicitly indicating to a user equipment (UE), position information of a target subcarrier for mapping a target phase tracking reference signal (PTRS) port, among subcarriers occupied by a target demodulation reference signal (DMRS) port, the method further includes:
    dividing a maximum number of DMRS ports supported by each DMRS configuration into multiple subcarrier-position-based DMRS ports groups, thereby forming preset DMRS port groups; wherein the DMRS ports in the same preset DMRS ports group occupy the same subcarriers, and the DMRS ports in different preset DMRS ports groups occupy different subcarriers.

6. A reference signal transmission method, applied to a user equipment (UE), comprising:
    obtaining position information of a target subcarrier implicitly or explicitly indicated by a base station; wherein the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port; and
    determining a target subcarrier according to the position information;
    obtaining PTRS, which is transmitted by the base station according to the position information with different PTRS ports being mapped to different subcarriers, on the target subcarrier;
    wherein the obtaining position information of a target subcarrier explicitly indicated by a base station, includes:
    obtaining the position information transmitted by the base station via signaling;
    wherein the position information includes: offset information of a preset reference subcarrier corresponding to the target DMRS port relative to the target subcarrier;
    wherein the determining of a target subcarrier according to the position information, includes:
    determining a target DMRS port associated with the target PTRS port; and
    according to the position information, determining the target subcarrier from subcarriers occupied by the target DMRS port.

7. The method according to claim 6, further comprising: obtaining PTRS on the target subcarrier and performing phase noise estimation according to the PTRS.

8. The method according to claim 6, wherein the obtaining position information of a target subcarrier implicitly indicated by a base station, includes:

obtaining the position information of the target subcarrier by predefinition;

wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

9. The method according to claim 6, wherein the each DMRS port is a port in a preset DMRS ports group;

the DMRS ports in the same preset DMRS ports group occupy the same subcarriers, and the DMRS ports in different preset DMRS ports groups occupy different subcarriers.

10. The method according to claim 9, wherein the preset DMRS ports groups are obtained by dividing a maximum number of DMRS ports supported by each DMRS configuration into multiple subcarrier-position-based DMRS ports groups.

11. A user equipment (UE) comprising: a transceiver, a memory, a processor, and a computer program stored on the memory and executable on the processor; wherein the processor is configured to execute the computer program to implement the following steps of the reference signal transmission method according to claim 6:

obtaining position information of a target subcarrier implicitly or explicitly indicated by a base station; wherein the target subcarrier is a subcarrier for mapping a target phase tracking reference signal (PTRS) port, among subcarriers occupied by a target demodulation reference signal (DMRS) port, and the target DMRS port is a DMRS port associated with the target PTRS port; and determining a target subcarrier according to the position information.

12. The UE according to claim 11, wherein the processor is configured to execute the computer program to further implement the following steps: obtaining PTRS on the target subcarrier and performing phase noise estimation according to the PTRS.

13. A base station comprising: a transceiver, a memory, a processor, and a computer program stored on the memory and executable on the processor; wherein the processor is configured to execute the computer program to implement the following steps:

implicitly or explicitly indicating to a user equipment (UE), position information of a target subcarrier for mapping a target phase tracking reference signal (PTRS) port, among subcarriers occupied by a target demodulation reference signal (DMRS) port; wherein the target DMRS port is a DMRS associated with the target PTRS port;

transmitting a PTRS according to the position information with different PTRS ports being mapped to different subcarriers;

wherein the processor is configured to execute the computer program to further implement the following steps:

transmitting the position information to the UE by signaling through the transceiver;

wherein the position information includes: offset information of a preset reference subcarrier corresponding to the target DMRS port relative to the target subcarrier;

wherein the processor is further configured to execute the computer program to further implement the following steps:

selecting the target subcarrier for mapping the PTRS port from the subcarriers occupied by the target DMRS port; and determining offset information of the target subcarrier relative to the preset reference subcarrier.

14. The base station according to claim 13, wherein the processor is configured to execute the computer program to further implement the following steps: transmitting a PTRS to the UE on the target subcarrier through the transceiver.

15. The base station according to claim 13, wherein the processor is configured to execute the computer program to further implement the following steps:

indicating the position information to the UE by predefinition;

wherein the position information includes: position of a subcarrier for mapping the PTRS port among subcarriers occupied by each DMRS port; or, offset information of a subcarrier for mapping the PTRS port among subcarriers occupied by each DMRS port relative to a preset reference subcarrier corresponding to the each DMRS port.

16. The base station according to claim 15, wherein the each DMRS port is a port in a preset DMRS ports group;

the DMRS ports in the same preset DMRS ports group occupy the same subcarriers, and the DMRS ports in different preset DMRS ports groups occupy different subcarriers.

17. The base station according to claim 13, wherein before implicitly or explicitly indicating to a user equipment (UE), position information of a target subcarrier for mapping a target phase tracking reference signal (PTRS) port, among subcarriers occupied by a target demodulation reference signal (DMRS) port, the processor is configured to execute the computer program to further implement the following steps:

dividing a maximum number of DMRS ports supported by each DMRS configuration into multiple subcarrier-position-based DMRS ports groups, thereby forming preset DMRS port groups; wherein the DMRS ports in the same preset DMRS ports group occupy the same subcarriers, and the DMRS ports in different preset DMRS ports groups occupy different subcarriers.

* * * * *